United States Patent
Curran et al.

(10) Patent No.: US 10,053,388 B2
(45) Date of Patent: Aug. 21, 2018

(54) MULTIFUNCTIONAL COMPOSITIONS AND MATERIAL LAMINATES WITH GRAPHITIC OR OTHER NANOMATERIALS

(71) Applicant: UNIVERSITY OF HOUSTON SYSTEM, Houston, TX (US)

(72) Inventors: Seamus Curran, Pearland, TX (US); Nigel Alley, Houston, TX (US); Kang-Shyang Liao, Houston, TX (US); Amrita Haldar, Houston, TX (US); Jennifer McAlpin, Houston, TX (US); Brian McElhenny, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 15/505,160

(22) PCT Filed: Aug. 19, 2015

(86) PCT No.: PCT/US2015/045806
§ 371 (c)(1),
(2) Date: Feb. 20, 2017

(87) PCT Pub. No.: WO2016/028844
PCT Pub. Date: Feb. 25, 2016

(65) Prior Publication Data
US 2017/0247288 A1 Aug. 31, 2017

Related U.S. Application Data

(60) Provisional application No. 62/038,955, filed on Aug. 19, 2014.

(51) Int. Cl.
*C03C 17/00* (2006.01)
*C03C 17/32* (2006.01)

(52) U.S. Cl.
CPC ............ *C03C 17/007* (2013.01); *C03C 17/32* (2013.01); *C03C 2217/29* (2013.01); *C03C 2218/112* (2013.01)

(58) Field of Classification Search
None
See application file for complete search history.

(56) References Cited

U.S. PATENT DOCUMENTS

| 6,020,419 A | 2/2000 | Bock et al. | |
| 2003/0180466 A1* | 9/2003 | Rohrbaugh | B08B 3/026 |
| | | | 427/372.2 |
| 2006/0063911 A1 | 3/2006 | Cayton et al. | |
| 2010/0240900 A1* | 9/2010 | Zhang | B82Y 30/00 |
| | | | 546/330 |
| 2015/0361230 A1 | 12/2015 | Curran et al. | |
| 2016/0046823 A1 | 2/2016 | Barrera et al. | |

FOREIGN PATENT DOCUMENTS

| EP | 0832947 B1 | 5/2003 |
| WO | 2015063701 A1 | 5/2015 |

* cited by examiner

*Primary Examiner* — Nathan T Leong
(74) *Attorney, Agent, or Firm* — Winstead PC

(57) ABSTRACT

Compositions and methods for improved materials and material laminates with graphitic or inorganic/organic nanomaterials are presented. Graphitic or inorganic/organic nanomaterials, such as carbon nanotubes, carbon nanofibers, graphenes or graphene oxides, are introduced into an aqueous composition as fillers to provide a graphitic or inorganic/organic nanocomposite. Such composition may be used as laminates to improve adhesion between a film and a layer of material or between layers of materials and to increase not only strength properties, but also to provide other desired properties such as electronic properties, UV absorbing/blocking, optical-limiting, anti-reflective, fire-retardant, conducting, anti-microbial properties or pigmentation to say material. By tailoring the composite formulations with multiple graphitic or organic/inorganic nanomaterials, the resulting materials laminates become multifunctional and can be used for a variety of applications.

14 Claims, No Drawings

MULTIFUNCTIONAL COMPOSITIONS AND MATERIAL LAMINATES WITH GRAPHITIC OR OTHER NANOMATERIALS

RELATED APPLICATIONS

This application claims the benefit of U.S. Provisional Patent Application No. 62/038,955, filed on Aug. 19, 2014, which is incorporated herein by reference.

FIELD OF THE INVENTION

This invention relates to compositions for treating materials, such as, but not limited to, strengthening materials, increasing structural integrity, and/or improving adhesion between materials (e.g. adhesion between a film and a layer or pane of material, such as glass, polycarbonate material, and acrylic material).

BACKGROUND OF THE INVENTION

In previous works entitled "Improved Materials, Treatment Compositions, and Material Laminates, with Carbon Nanotubes" (WO 2015/063701), the formation of composite with carbon nanotubes (CNTs) for increasing protection levels and strength properties of materials such as glass laminates was demonstrated. When applied to glass, the strength properties of CNTs incorporated composite laminates showed a 50% increase while the original composite laminates without CNTs showed only a 20% increase. The substantial increase of the glass strength with the CNTs incorporated composite laminates can be attributed to the CNT network forming between the glass surface and the composite laminates during the drying/curing process. The CNT network together with the composite is more effective to dispatch the impact stress generated by foreign projectiles comparing to the composite laminates alone.

A graphitic or organic/inorganic nanocomposite is discussed herein that enables a water based spray-on application to be used to enhance strength, structural integrity, improve adhesion, or combinations thereof. The graphitic or organic/inorganic nanocomposite allows for spray-on application to quickly and economically strengthen a material coated with the graphitic or organic/inorganic nanocomposite. For example, the graphitic or organic/inorganic nanocomposite may be utilized to strengthen existing glazing to resist impacts, such as in hurricane prone areas, which will have an enormous impact on the ability of building envelopes to withstand high wind speeds.

SUMMARY OF THE INVENTION

In one embodiment, a process for fabricating materials laminated with graphitic or organic/inorganic nanocomposite may include 1) selecting one or a mixture of specific graphitic or organic/inorganic nanomaterials; 2) optionally purifying the graphitic or organic/inorganic nanomaterials; 3) mixing the graphitic or organic/inorganic nanomaterials with one or a mixture of specific surfactants to form an intermediate mixture; 4) adding the intermediate mixture into a base composite solution to form a graphitic or organic/inorganic nanomaterials/composite solution for materials laminates; 5) optionally activating the surface of materials to be coated (e.g. layers or panes of glass, polycarbonate material, and acrylic material); and 6) depositing the graphitic or organic/inorganic nanomaterials/composite solution on the surface of materials to form laminates after drying.

In some embodiments, graphitic nanomaterials may comprise at least one type of material that is rich in carbon content that is densely packed in a regular $sp^2$-bonded structure. Non-limiting examples of such materials include, but are not limited to, carbon black, carbon nanofiber, graphite, graphene, graphene oxide, carbon nanotube, micro carbon fibers (e.g. 10 microns or less), and related derivatives thereof.

In some embodiments, the graphitic nanocomposite may be an aqueous composition with graphitic nanomaterials therein. The graphitic nanocomposite may be utilized for a variety of purposes, such as for increasing protection levels of materials and strength properties; for treating porous materials (e.g. cement, concrete, or the like); for enhancing the lamination of multiple layers of materials or panes of glass (e.g. laminates, multi-layer laminates, glass laminates, or the like); for use in safety and security applications such as hurricane-proof or bullet-resistant windows; for facilitating enhancement of material properties and/or such lamination; and/or the like.

In some embodiments, the graphitic nanocomposite may be provided in a composite solution to aid application, coating, or the like onto a desired surface. In some embodiments, the composite solution for treating the surface of materials (e.g. layers or panes of glass, polycarbonate material, and acrylic material) may include surfactant(s) to enhance homogeneity of the graphitic nanomaterial(s) in the solution. In some embodiments, the composite solution may include, but is not limited to, water, a silane, an alcohol, a glycerol, or the like to achieve a desired viscosity for the solution. In some embodiments, the composite solution may include an adhesive, such as, but not limited to, an acetate adhesive (e.g. vinyl acetate monomer, polyvinyl acetate, or vinyl acetate ethylene emulsion), to aid bonding of the graphitic nanocomposite to a desired surface.

In some embodiment, an aqueous composition may comprise a base composite solution with organic/inorganic nanomaterials therein. In some embodiments, additives may be included in the base composite solution to aid adhesion between a film and a layer or pane of material (e.g. glass, polycarbonate material, and acrylic material) or for improving adhesion between adjacent panes or layers of materials (e.g. glass, polycarbonate material, and acrylic material). In some embodiments, the composition may be utilized for increasing protection levels of materials and strength properties, UV absorbing/blocking, optical-limiting, anti-reflective, fire-retardant, conducting, anti-microbial properties or pigmentation or a combination thereof. In some embodiments, the composition may be utilized for treating porous materials, e.g., but not limited to, cement, concrete, laminates, multi-layer laminates, glass laminates, or the like. In some embodiments, the composition may be utilized for enhancing the lamination of multiple layers of materials. As nonlimiting examples, the composition may be utilized to enhance lamination of panes of glass, in safety and security applications such as hurricane-proof or bullet-resistant windows, the composition by enhancing lamination properties and/or such lamination; and of the compositions with organic/inorganic nanomaterials.

In some embodiments, one or more functional organic/inorganic nanomaterial additives may be added into the base composite solution for materials laminates, but these additives do not impair the original functions of the materials laminates. In nonlimiting embodiments, the functional additives may have the properties of UV absorbing/blocking, optical-limiting, anti-reflective, fire-retardant, conducting or/or anti-microbial. In nonlimiting embodiments, the additives can be composed of, but are not limited to, organic/inorganic molecules/polymers having molecular weight up to about 100,000 Da. In nonlimiting embodiments, the additives can be can be composed of organic micro/nano materials in their natural or synthetic forms (e.g. particles, nanotubes and nanosheets) having sizes equal to or between about 1 nm to 500 μm. In nonlimiting embodiments, the additives can be can be composed of metal/metal oxide micro/nano materials (e.g. silver, titanium oxide, zinc oxide, aluminum oxide, iron oxide and clay, which may be composed of kaolinite, montmorillonite, illite or chlorite) in their natural or synthetic forms (e.g. particles, nanotubes and nanosheets) having sizes equal to or between about 1 nm to 500 μm.

In some embodiments, one or more pigments, which do not impair the original functions of the original functions of the materials utilized in the laminates, may be added into the base composite solution for materials laminates. Such pigments may include materials that change the color of reflected or transmitted light as the result of wavelength-selective absorption. Nonlimiting examples include the range of wavelengths humans can or cannot perceive, such as visible light having wavelength from approximately 380 to 800 nm; ultraviolet light having wavelengths approximately 100 to 380 nm and infrared radiation having wavelength from approximately 800 nm to 1 mm. The pigments may include, but are not limited to, metal-based inorganic pigments containing metal elements such as Cadmium, Chromium, Cobalt, Copper, Iron oxide, Lead, Manganese, Mercury, Titanium and Zinc; other inorganic pigments such as Carbon, Clay earth and Ultramarine; organic pigments such as alizarin, alizarin crimson, gamboge, carmine, purpurin, indigo, Indian yellow, Tyrian purple, quinacridone, magenta, phthalo green, phthalo blue, diarylide yellow, pigment red, pigment yellow, pigment green, pigment blue; and other inorganic or organic derivatives thereof. In some embodiments, pigments also include materials that protect the host composite against the degradation caused by exposure to ultraviolet radiation, such as ultraviolet light absorbers and hindered-amine light stabilizers (e.g. Uvasil and Tinuvin). In some embodiments, pigments may include materials that emit colors, such as through fluorescence, phosphorescence, and/or other forms of luminescence. Such pigments may include but are not limited to fluorophores, such as Fluorescein, Rhodamine, Coumarin, Cyanine and their derivatives; or phosphorescent dyes such as Zinc sulfide, Strontium aluminate and their derivatives.

In some embodiments, the composite solution may include, but is not limited to, water, a silane, an alcohol, a glycerol, or the like to achieve a desired viscosity for the solution. In some embodiments, the composite solution may include an adhesive, such as, but is not limited to, an acetate adhesive (e.g. vinyl acetate monomer, polyvinyl acetate, or vinyl acetate ethylene emulsion), to aid bonding of the graphitic nanocomposite to a desired surface. In some embodiments, the composite solution may include but is not limited to, one or more surfactants.

The foregoing has outlined rather broadly various features of the present disclosure in order that the detailed description that follows may be better understood. Additional features and advantages of the disclosure will be described hereinafter.

DETAILED DESCRIPTION OF THE INVENTION

It is to be understood that both the foregoing general description and the following detailed description are exemplary and explanatory only, and are not restrictive of the invention, as claimed. While most of the terms used herein will be recognizable to those of ordinary skill in the art, it should be understood that when not explicitly defined, terms should be interpreted as adopting a meaning presently accepted by those of ordinary skill in the art. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Multifunctional compositions and material laminates with graphitic or organic/inorganic nanomaterials are discussed herein. These multifunctional compositions and material laminates with graphitic or organic/inorganic nanomaterials offers new compositions and methods for making laminates from nanocomposites for increasing or modifying strength properties, electronic properties, adhesion, UV absorbing/blocking, optical-limiting, anti-reflective, fire-retardant, conducting, anti-microbial properties, pigmentation, or combinations thereof. The various embodiments of graphitic or organic/inorganic nanomaterials and/or methods for manufacturing offer new compositions and methods for making laminates from graphitic nanocomposites for increasing strength properties and/or electronic properties.

More specifically, embodiments discussed herein relate to compositions and methods for making graphitic or organic/inorganic nanocomposites. In some embodiments, a method for making a graphitic or organic/inorganic nanocomposite may comprise one or more of the following steps: 1) selecting one or a mixture of specific graphitic or organic/inorganic nanomaterials; 2) optionally purifying the graphitic or organic/inorganic nanomaterials; 3) mixing the graphitic or organic/inorganic nanomaterials with one or a mixture of surfactants to form an intermediate mixture; 4) adding the intermediate mixture into a base composite solution to form a graphitic or organic/inorganic nanomaterials/composite solution for materials laminates; 5) optionally activating the surface of materials (e.g. layers or panes of glass, polycarbonate material, and acrylic material); and 6) depositing the graphitic or organic/inorganic nanomaterials/composite solution on the surface of materials to form laminates after drying.

In some embodiments, the graphitic nanomaterials may be carbon nanotubes (CNTs), including single and multi-walled CNTs. It should be noted that CNTs present EPA concerns that may require EPA approval. Thus, the use of other graphitic materials may be desirable to avoid any potential toxicity risk associated with CNTs. Further, the use of other graphitic materials may offer more consistent graphitic nanocomposite. In additional to carbon nanotubes, the graphitic nanomaterials may be graphenes, graphene oxides, or derivatives thereof. Graphenes possess unique electronic properties such as the quantum hall effect in condensed-matter materials and excellent mobility of charge carriers due to its unique π-conjugated carbon monolayer 2D system. Based on these qualities, many researchers have focus on the development of graphene-based electronic devices with single or few-layer graphene sheets produced commonly by chemical vapor deposition (CVD) methods. However, study of the EM attenuation/amplification properties of graphenes or graphene oxides embedded in a composite formation is still limited due to the difficulties of produce large quantity of graphenes or graphene oxides. By using liquid-phase exfoliation of graphite in common organic solvent such as N-methyl-2-pyrrolidone (NMP), graphene/graphene oxide dispersion can be produced with high-yield to provide suitable graphitic nanomaterials desired for the graphitic nanocomposites discussed herein. Because of the strong π-π interactions, graphenes or graphene oxides are expected to process strong EM attenuation/amplification properties in additional to the increasing strength properties of the composites.

In some embodiments, the graphitic nanomaterials may be carbon nanofibers (CNFs), which are cylindrical nanostructures with graphene layers arranged in shapes, such as stacked cones, cups or plates. Similar to CNTs, CNFs have drawn lots of attention for their potential thermal, electrical, frequency shielding, and mechanical property enhancements.

Although the above mentioned graphitic nanomaterials all share a regular $sp^2$-bonded structure, their interfacial physical properties can be very different due to the differences in dimension (e.g. diameter and length), geometry (e.g. tubes, cups or sheets), surface area (e.g. single layer or multiple layers) and additional functional groups located at edge/defect sites (e.g. hydroxyl, ketone, epoxy and carboxylate). In some embodiments, the graphitic nanomaterials utilized for the graphitic nanocomposite may include a variety nanomaterials including, but not limited to, carbon black, carbon nanotubes, carbon nanofibers, graphite, graphenes, graphene oxides, micro carbon fibers (e.g. 10 microns or less), buckyballs, or the like. To use a variety of graphitic nanomaterials as fillers for increasing strength properties and electronic properties of the host composites, different approaches may be needed when forming each composite. Specific methods to convert each graphitic nanomaterial to their suitable form to disperse in an aqueous composite solution for materials laminates are disclosed herein.

In some embodiments, graphitic nanomaterials may comprise at least one type of material that is rich in carbon content that is densely packed in a regular $sp^2$-bonded structure. Non-limiting examples of such materials include, but not limited to, carbon black, carbon nanofiber, graphite, graphene, graphene oxide, carbon nanotube, micro carbon fibers (e.g. 10 microns or less), and their derivatives.

In some embodiments, the selected graphitic nanomaterials may be optionally purified. Purification of graphitic nanomaterials may comprise at least one type of chemical treatments that selectively removes the impurities that do not share the common structure with the graphitic nanomaterials, i.e. carbon atoms densely packed in a regular $sp^2$-bonded structure. Depending on the processes to produce graphitic nanomaterials, impurities may include metal particles (e.g. iron or nickel particles, used as catalysts) and amorphous carbon species. In some embodiments, purification of the graphitic nanomaterials may comprise a step for removing metal impurities, a step for removing amorphous carbon impurities, or a combination thereof. As a nonlimiting example, the carbon nanomaterials are purified by the following steps:

1) the carbon nanomaterials are first dispersed in concentrated acid solution (e.g. hydrochloric acid, sulfuric acid or nitric acid) to remove metal particles. In some embodiments, to shorten the reaction time, the mixture is sonicated for about 10 to 60 minutes and/or stirred for about 1 to 24 hours. The carbon nanomaterials may then be separated from the solution (e.g. by centrifuge) and washed thoroughly with water; and/or 2) the carbon nanomaterials are then dispersed in either a concentrated hydrogen peroxide solution, a concentrated hydrogen peroxide/sulfuric acid solution, or a concentrated sulfuric acid/nitric acid solution to remove amorphous carbon impurities. In some embodiments, to shorten the reaction time, the mixture is sonicated for about 10 to 60 minutes and/or stirred for about 1 hour to 7 days. The carbon nanomaterials may then be separated from the solution (e.g. by centrifuge) and washed thoroughly with water. Purified carbon nanomaterials are obtained after the water is fully removed.

Due to the structural and other differences in these allotropes of carbon, it was difficult to predict whether the process utilized for CNTs is also applicable to other allotropes of carbon and other methods (different from the methods for CNTs) may be necessary to properly disperse the carbon nanomaterials in the host composite. Specific methods to convert each graphitic nanomaterial to their suitable form were used to disperse them in an aqueous composite solution for materials laminates. This work confirmed that graphitic nanomaterials other than carbon nanotubes, such as carbon nanofibers and graphenes, when dispersing in an aqueous composite solution properly, can also provide increasing strength properties to materials such as glass laminates.

However, it is difficult to predict whether the abovenoted process utilized for CNTs is also applicable to these organic/inorganic nanomaterials, and other methods (different from the methods utilized for CNTs) may be necessary to properly disperse the nanomaterials in the host composite using specific methods to convert each nanomaterial to their suitable form to disperse them in an aqueous composite solution for materials laminates. Multifunctional compositions and material laminates with nanomaterials discussed herein provide formulations that are further expended to a variety of organic/inorganic nanomaterials as fillers for not only increasing strength properties of the host composites, but also for providing other desired properties such as UV absorbing/blocking, optical-limiting, anti-reflective, fire-retardant, conducting, anti-microbial properties or pigmentation by using specific methods to convert each organic/inorganic nanomaterial to their suitable form to disperse in an aqueous composite solution for materials laminates. For example, high refractive indices nanomaterials such as Titanium oxides or Zinc oxides are well known to be excellent UV blockers. When properly imbedded into a host composite, the UV-blockers can reduce the photo-degradation of the host materials by the harmful UV rays from the sunlight. Clay—phyllosilicate minerals in a formation of multilayer nanosheets, when properly imbedded into a host polymer composition, can be used as a fire-retardant coating for structure materials, which are highly flammable by their own. By tailoring the composite formulations with multiple organic/inorganic nanomaterials, the resulting materials laminates become multifunctional and can be used for a variety of applications.

In some embodiments, one or more functional organic/inorganic nanomaterial additives may be added into a base composite solution for materials laminates. In some embodiments, the nanomaterial additive may act as filler for modifying or increasing strength properties, electronic properties, UV absorbing/blocking, optical-limiting, anti-reflective, fire-retardant, conducting, and/or anti-microbial features of the host composites. In some embodiments, nanomaterial additive may be a graphitic nanocomposite. The graphitic nanocomposite may be selected from one or more of a variety of graphitic nanomaterials, such as carbon nanotubes, carbon nanofibers, graphenes or graphene oxides. In some embodiments, the nanomaterial additives can be composed of, but not limited to, organic/inorganic molecules/polymers having molecular weight up to about 100,000 Da. In some embodiments, the nanomaterial additives may be organic micro/nano materials in their natural or synthetic forms (e.g. particles, nanotubes and nanosheets) having sizes equal to or between about 1 nm to 500 µm. In some embodiments, the nanomaterial additives may be metal/metal oxide micro/nano materials (e.g. silver, titanium oxide, zinc oxide, aluminum oxide, iron oxide and clay, which may be composed of kaolinite, montmorillonite, illite or chlorite) in their natural or synthetic forms (e.g. particles, nanotubes and nanosheets) having sizes equal to or between about 1 nm to 500 µm.

In some embodiments, one or more pigments, which do not impair the original functions of the original functions of the materials laminates, may be added into the base composite solution for materials laminates. The pigments may include materials that change the color of reflected or transmitted light as the result of wavelength-selective absorption. Nonlimiting examples include the range of wavelengths humans can or cannot perceive, such as visible light having wavelength from approximately 380 to 800 nm; ultraviolet light having wavelengths approximately 100 to 380 nm and infrared radiation having wavelength from approximately 800 nm to 1 mm. In some embodiments, the pigments may include, but are not limited to, metal-based inorganic pigments containing metal elements such as Cadmium, Chromium, Cobalt, Copper, Iron oxide, Lead, Manganese, Mercury, Titanium and Zinc; other inorganic pigments such as Carbon, Clay earth and Ultramarine; organic pigments such as alizarin, alizarin crimson, gamboge, carmine, purpurin, indigo, Indian yellow, Tyrian purple, quinacridone, magenta, phthalo green, phthalo blue, diarylide yellow, pigment red, pigment yellow, pigment green, pigment blue; and other inorganic or organic derivatives thereof. In some embodiments, pigments also include materials that protects host composite against the degradation caused by exposure to ultraviolet radiation, such as ultraviolet light absorbers and hindered-amine light stabilizers (e.g. Uvasil and Tinuvin). In some embodiments, pigments may include materials that emit colors, such as through fluorescence, phosphorescence, and/or other forms of luminescence. Such pigments may include but are not limited to fluorophores, such as Fluorescein, Rhodamine, Coumarin, Cyanine and their derivatives; or phosphorescent dyes such as Zinc sulfide, Strontium aluminate and their derivatives.

In some embodiments, optional purification of organic/inorganic nanomaterials may comprise at least one type of chemical treatment that selectively removes the impurities that do not share a common structure with the organic/inorganic nanomaterials. As a nonlimiting example, the organic/inorganic nanomaterials may be purified by oxidation, reduction, or acid/base treatment. In some embodiments, purification of organic/inorganic nanomaterials may comprise at least one type of physical treatment that selectively enriches the components of interest, (e.g., material size distribution, material shapes, material consistency, etc.). As a nonlimiting example, the organic/inorganic nanomaterials may be enriched by sieving, ultrasonication, centrifugation, extraction or chromatography.

In some embodiments, the graphitic or organic/inorganic nanomaterials are mixed with one or a mixture of surfactants to form a mixture. Any suitable surfactants may be used, including, but not limited to, anionic surfactants, cationic surfactants, ampholytic surfactants, non-ionic surfactants, and/or the like. Non-limiting examples of suitable anionic surfactants include, but not limited to, alkyl sulfonates, alkyl benzenesulfonates, alkyl phosphates, alkyl carboxylates and alkyl sarcosines with the alkyl group comprises from 8 to 24 carbon atoms, and/or the like. The anionic surfactants can be present in free acid forms or in salts (e.g. lithium salt, sodium salt, potassium salt, magnesium salt or calcium salt). More specifically, a preferred nonlimiting example of such a suitable surfactant comprises sodium dodecyl-benzenesulfonate. In some embodiments, the mixture of the graphitic or organic/inorganic nanomaterials and the surfactant(s) is preferred to be stirred for about 1 hour to 7 days.

In some embodiments, the graphitic or organic/inorganic nanocomposite comprises a base composite solution to aid treatment, application, coating, or the like of/onto a desired surface. In some embodiments, after purified graphitic or organic/inorganic nanomaterials have been mixed with surfactant, they may be mixed with a base composite solution. In some embodiments, a base composite solution for treating the surface of materials (e.g. layers or panes of glass, polycarbonate material, and acrylic material) may include, but is not limited to, water, a silane, an alcohol, a glycerol, and/or the like to achieve a desired viscosity for the solution. Materials of the base composite solution that may be suitable for treating the surface of materials may include solvents, adhesives, surfactants, and/or the like. In some embodiments, the base composite solution may include solvents to achieve a desired viscosity for the solution. In some embodiments, the base composite solution may include an adhesive, such as, but not limited to, an acetate adhesive (e.g. vinyl acetate monomer, polyvinyl acetate, or vinyl acetate ethylene emulsion), to aid bonding of the graphitic or organic/inorganic nanocomposite to a desired surface. In some embodiments, the base composite solution may include a surfactant to enhance homogeneity of the graphitic or organic/inorganic nanomaterials in the solution. As nonlimiting examples, the base composite solution may comprise water, a silane, an alcohol, a glycerol and an acetate adhesive (e.g. vinyl acetate monomer, polyvinyl acetate, and/or vinyl acetate ethylene emulsion). More specifically, a nonlimiting example of such a base composite solution comprises water, 3-glycidoxypropyl-trimethoxysilane, isopropanol, glycerol and vinyl acetate monomer. In some embodiments, the purified graphitic or organic/inorganic nanomaterials and surfactant are mixed with the base composite solution by stirring for about 3 days or more to allow them to mix well. In some embodiments, the graphitic or organic/inorganic nanomaterials form between 0.01% to 10% of the mixture of the graphitic or organic/inorganic nanomaterials/base composite solution. This very small amount of graphitic or organic/inorganic material avoids aggregation problems that may occur with higher concentrations that would actually weaken graphitic nanocomposite.

In some embodiments, the base composite solution for treating the surface of materials (e.g. layers or panes of glass, polycarbonate material, and acrylic material) may include, but is not limited to, water, a silane, an alcohol, a glycerol, or the like to achieve a desired viscosity for the solution. In some embodiments, the base composite solution may include an adhesive, such as, but is not limited to, an acetate adhesive (e.g. vinyl acetate monomer, polyvinyl acetate, or vinyl acetate ethylene emulsion), to aid bonding of the graphitic nanocomposite to a desired surface. In some embodiments, the base composite solution may include but is not limited to, one or more surfactants. In some embodiments, an example of such base composite solution includes, but is not limited to, a solution comprising water, 3-glycidoxypropyl-trimethoxysilane, isopropanol, glycerol and vinyl acetate monomer.

In some embodiments, a target surface of materials may be optionally activated before the deposition of the graphitic or organic/inorganic nanomaterials/composite solution. The surface activation may be achieved by reaction with ozone, oxygen, hydrogen peroxide, halogens, other reactive oxidizing species, or combinations thereof. The purpose of target surface activation is to create an energetically reactive surface to bind molecules of the graphitic nanocomposite on the surface covalently. In some embodiments, the surface activation may be achieved by ozone plasma generated by intense UV light. In other embodiments, surface activation may be achieved by plasma treatment. In yet another embodiment, surface activation may be achieved by ozone generation using a corona discharge, flame, or plasma.

In some embodiment, as a nonlimiting example, the mixture of the graphitic or organic/inorganic nanomaterials/composite solution may be deposited on the target surface of materials by spraying or doctor-blading. In some embodiments, the target surface of the materials may be dipped into the graphitic or organic/inorganic nanomaterials/composite solution for a set period of time equal to or between about 1 second and 24 hour. The solvent may then be removed from the materials, and the materials may be dried or cured at a set temperature equal to or between about 25 and 200° C.

EXPERIMENTAL EXAMPLES

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Preparing base composite solution: a base composite solution was made by mixing together 3 mL of glycerol (99% pure synthetic, from Sigma-Aldrich); 10 mL of 3-glycidoxypropyl-trimethoxysilane (from Gelest, Inc.), 2 mL of isopropanol and 3.785 liters of water. These components were stirred until fully mixed and allowed to set for 24 hours.

Preparing composite solution with carbon nanotubes (CNTs): carbon nanotubes used here (multi-walled carbon nanotubes as SMW 200, purchased from Sigma-Aldrich) had an average diameter of about 10 nm and length of 3-6 µm. The CNTs were first purified by the following steps: 1) the CNTs were first dispersed in 18% HCl aqueous solution. The resulting mixture was sonicated for 1 hour and stirred for 8 hours to remove metal impurities. The CNTs were separated by centrifuge and washed thoroughly with water. 2) The CNTs were then dispersed in 30% $H_2O_2$ aqueous solution. The resulting mixture was sonicated for 1 hour and stirred for 3 days to remove amorphous carbon impurities. The CNTs were separated by centrifuge and washed thoroughly with water. In the next step, purified CNTs (200 mg in 20 mL water) were added into sodium dodecyl-benzenesulfonate (SDBS) solution (3.8 g in 20 mL water) and stirred for 3 days to form a stable CNTs/SDBS suspension. 10 mL of CNTs/SDBS suspension (corresponding to 50 mg of CNTs) was added into 1 qt. (about 950 mL) of the base composite solution described above. The mixture was sonicated for 30 minutes and 3 drops (about 0.1 mL) of vinyl acetate monomer (as PC6694W VAM from Clifton Adhesives Company) was added. The mixture is stirred for 24 hours and set for 3 days to allow any aggregations to settle. The resulting solution (without any aggregations) may be further diluted down with more base composite solution to the concentration of 50-100 mg/gal.

Preparing composite solution with carbon nanofibers (CNFs): carbon nanofibers (as PR-24-XT-PS, purchased from Pyrograf Products, Inc.) have an average diameter of about 100 nm and has a minimal chemically vapor deposited (CVD) layer of carbon on the surface of the fiber over a graphitic tubular core. The CNFs were first purified by the following steps: 1) the CNFs were first dispersed in 18% HCl aqueous solution. The resulting mixture was sonicated for 1 hour and stirred for 8 hours to remove metal impurities. The CNFs were separated by centrifuge and washed thoroughly with water. 2) The CNFs were then dispersed in 30% $H_2O_2$ aqueous solution. The resulting mixture was sonicated for 1 hour and stirred for 3 days to remove amorphous carbon impurities. The CNFs were separated by centrifuge and washed thoroughly with water. In the next step, purified CNFs (200 mg in 20 mL water) were added into sodium dodecyl-benzenesulfonate (SDBS) solution (3.8 g in 20 mL water) and stirred for 3 days to form a stable CNFs/SDBS suspension. 10 mL of CNFs/SDBS suspension (corresponding to 50 mg of CNFs) was added into 1 qt. (about 950 mL) of the base composite solution described above. The mixture was sonicated for 30 minutes and 3 drops (about 0.1 mL) of vinyl acetate monomer (as PC6694W VAM from Clifton Adhesives Company) was added. The mixture is stirred for 24 hours and set for 3 days to allow any aggregations to settle. The resulting solution (without any aggregations) may be further diluted down with more base composite solution to the concentration of 50-100 mg/gal.

Preparing composite solution with graphenes or graphene oxides: graphenes or graphene oxides were prepared by either the following three methods: 1) graphite powder (<20 µm, purchased from Sigma-Aldrich) was dispersed in N-Methyl-2-pyrrolidone (NMP). The mixture was sonicated for 1 hour and then stirred rigorously for 7 days to force the graphene to exfoliate. The final suspension was centrifuged at 10,000 rpm for 30 minutes and the supernatant was collected. The supernatant contains mainly few layer graphenes. 2) Graphite was first dispersed in concentrated $H_2O_2/H_2SO_4$ aqueous solution. The resulting mixture was sonicated for 1 hour and stirred for 8 hours to form the oxidized product (graphene oxides). The graphene oxides were separated by centrifuge and washed thoroughly with water. The solid was then dispersed in NMP using the same process as 1). The final suspension was centrifuged at 10,000 rpm for 30 minutes and the supernatant was collected. 3) Graphite was first dispersed in concentrated $HNO_3/H_2SO_4$ aqueous solution. The resulting mixture was sonicated for 1 hour and stirred for 8 hours to form the oxidized product (graphene oxides). The graphene oxide was separated by centrifuge and washed thoroughly with water. The solid was then dispersed in NMP using the same process as 1). The final suspension was centrifuged at 10,000 rpm for 30 minutes and the supernatant was collected. In the next step, graphene or graphene oxide suspensions (in 20 mL NMP)

were added into sodium dodecyl-benzenesulfonate (SDBS) solution (3.8 g in 20 mL water) and stirred for 3 days to form stable graphenes or graphene oxides/SDBS suspensions. 10 mL of graphenes or graphene oxides/SDBS suspensions were added into 1 qt. (about 950 mL) of the base composite solution described above. The mixture was stirred for 30 minutes and 3 drops (about 0.1 mL) of vinyl acetate monomer (as PC6694W VAM from Clifton Adhesives Company) was added. The mixture is stirred for 24 h and set for 3 days. No aggregations were observed in the resulting mixture.

Glass plate preparation: 8" by 8" by 1/8" square glass panes were cut into four equally sized plates. The plates were labeled to indicate which pane they came from and which quadrant the plate was in. Dish soap and water were used to rinse away any dirt, oils, and glass fragments which accumulated on the plates. They were then cleaned of any markings with acetone and then once again with isopropanol prior to coating. Optionally, the surfaces of glass plates from selected panes were activated with ozone plasma before applying the coating. The four plates from the pane were treated using a PSD Series Digital UV Ozone System. All four plates at once were exposed to the ozone generating UV light for 5 minutes per side. Coating of these plates took place immediately following the treatment.

Applications of coating and drying/curing: three of the four plates from each pane were coated with the solutions by using standard handheld spray bottles. The nozzles were adjusted so that overspray would be minimal from a spray distance of about 25 cm. The plates were leaned upright against a backing at about 60° above the horizontal. The line of spray was kept perpendicular to the plate; thus the angle of the spray stream was about 30° below the horizontal. Each side of the plates were sprayed with four pumps from the bottle while using a slight left and right motion to ensure complete coverage. Four pumps from the spray bottles dispensed between 4.0 and 4.5 mL of solution. After allowing the plates to drain for at least 30 seconds, they were placed upright in a clean box which was isolated from the room air. Drying took place in the box for a minimum of 16 hours. All spraying and drying was done in an air conditioned environment between 20° and 25° C. Once the plates were dried they were placed in an oven to cure. The oven was equipped with intake and exhaust air ports along with an air circulation pump to reduce any accumulation of moisture. The plates were placed in the oven to cure for a minimum of 16 hours at a temperature between 40° and 45° C. Once curing was complete the plates were placed in labeled sealable bags to protect the coatings during transport.

Transmission spectra of coated glass plates: the UV and visible (UV-Vis) transmission spectra of each coated plate was taken both before and after curing in the oven. The UV-Vis source was supplied by halogen and deuterium lamps while the UV-Vis irradiance was measured using an Ocean Optics Inc. HR 2000+ High Resolution Photo Spectrometer. The irradiance values were measured as a percentage with the transmission through air being the 100% reference. Marks and measurements on the plates were used to ensure that the UV-Vis was taken at identical points in every plate before and after curing. The transmission spectra show no difference (or a difference that was below the variation generated by the instrument) between the coated glass plates and pristine ones.

Strength testing: the testing method for equibiaxial flexural strength was adopted from the ASTM standard (ASTM Designation C1499-09, Reapproved 2013), but with some modification. The standard calls for the ring on ring method where an Instron 4505 was used to compress the test specimens between the rings to the failure point. The outside diameter of the load ring and support ring measured 45.237 mm and 83.109 mm respectively. The cross sections of the rings had no tip radius. Instead the interfaces between the rings and test specimens were circular annuli with beveled edges. The inner and outer diameters of the load ring annulus were approximately 41.300 mm and 44.450 mm respectively. The inner and outer diameters of the support ring annulus were approximately 82.017 mm and 77.089 mm respectively. Parafilm was used for the protective layers between the rings and test specimens. Cellophane tape was used as a friction reducing agent for the load ring. The tape was placed between the parafilm and the test specimen with the adhesive side to the parafilm. All strength testing took place in an air conditioned environment between 20° and 25° C. The stress, load, and displacement values were recorded at the breaking points of each test. The one plate left uncoated from each 8" by 8" pane served as the glass baseline only for the test specimens which were cut from the common pane. This was necessary because of the high deviation of stress values observed in the plain glass. The broken specimens were handled carefully so pictures could be taken of the fracture patterns. Each specimen was checked for its test validity and then categorized according to the energy associated with its fracture pattern. The results show an increase in strength (%) comparing to uncoated glass plane reference:

| | |
|---|---|
| Uncoated | 0% |
| Composition solution without graphitic nanomaterials | 37% |
| Composition solution with CNT | 56% |
| Composition solution with CNF | 52% |
| Composition solution with Graphene | 43% |

Preparing base composite solution: a base composite solution was made by mixing together 3 mL of glycerol (99% pure synthetic, from Sigma-Aldrich); 10 mL of 3-glycidoxypropyl-trimethoxysilane (from Gelest, Inc.), 2 mL of isopropanol and 3.785 liters of water. These components were stirred until fully mixed and allowed to set for 24 hours.

Preparing composite solution with silica nanoparticles: silica nanoparticles (as silica nanopowder, 5-15 nm spherical particles, obtained from Sigma-Aldrich) were used directly without any purification. Silica nanoparticles (200 mg) were added into sodium dodecyl-benzenesulfonate (SDBS) solution (3.8 g in 40 mL water) and stirred for 3 days to form a stable silica nanoparticles/SDBS suspension. 10 to 40 mL of silica nanoparticles/SDBS suspension (corresponding to 50 to 200 mg of silica nanoparticles) was added into 1 qt. (about 950 mL) of the base composite solution described above. The mixture was sonicated for 30 minutes and 3 drops (about 0.1 mL) of vinyl acetate monomer (as PC6694W VAM from Clifton Adhesives Company) was added. The mixture is stirred for 24 hours and set for 3 days to allow any aggregations to settle. The resulting solution (without any aggregations) may be used directly or further diluted down with more base composite solution to a lower concentration.

Preparing composite solution with titanium oxide nanoparticles: titanium oxide nanoparticles (as titanium oxide nanopowder, <25 nm particle size, obtained from Sigma-Aldrich) were used directly without any purification. Titanium oxide nanoparticles (200 mg) were added into sodium dodecyl-benzenesulfonate (SDBS) solution (3.8 g in 40 mL water) and stirred for 3 days to form a stable titanium oxide nanoparticles/SDBS suspension. 10 to 40 mL of titanium oxide nanoparticles/SDBS suspension (corresponding to 50 to 200 mg of titanium oxide nanoparticles) was added into 1 qt. (about 950 mL) of the base composite solution described above. The mixture was sonicated for 30 minutes and 3 drops (about 0.1 mL) of vinyl acetate monomer (as PC6694W VAM from Clifton Adhesives Company) was added. The mixture is stirred for 24 hours and set for 3 days to allow any aggregations to settle. The resulting solution (without any aggregations) may be used directly or further diluted down with more base composite solution to a lower concentration.

Preparing composite solution with iron oxide particles: iron oxide particles (as iron(III) oxide powder, <5 μm particle size, obtained from Sigma-Aldrich) were used directly without any purification. Iron oxide particles (200 mg) were added into sodium dodecyl-benzenesulfonate (SDBS) solution (3.8 g in 40 mL water) and stirred for 3 days to form a stable iron oxide particles/SDBS suspension. 10 to 40 mL of iron oxide particles/SDBS suspension (corresponding to 50 to 200 mg of iron oxide particles) was added into 1 qt. (about 950 mL) of the base composite solution described above. The mixture was sonicated for 30 minutes and 3 drops (about 0.1 mL) of vinyl acetate monomer (as PC6694W VAM from Clifton Adhesives Company) was added. The mixture is stirred for 24 hours and set for 3 days to allow any aggregations to settle. The resulting solution (without any aggregations) may be used directly or further diluted down with more base composite solution to a lower concentration.

Preparing composite solution with clay: clay (as CSCA++, obtained from Southern Clay Products Inc.) was used directly without any purification. Clay (200 mg) were added into sodium dodecyl-benzenesulfonate (SDBS) solution (3.8 g in 40 mL water) and stirred for 3 days to form a stable clay/SDBS suspension. 10 to 40 mL of clay/SDBS suspension (corresponding to 50 to 200 mg of clay) was added into 1 qt. (about 950 mL) of the base composite solution described above. The mixture was sonicated for 30 minutes and 3 drops (about 0.1 mL) of vinyl acetate monomer (as PC6694W VAM from Clifton Adhesives Company) was added. The mixture is stirred for 24 hours and set for 3 days to allow any aggregations to settle. The resulting solution (without any aggregations) may be used directly or further diluted down with more base composite solution to a lower concentration.

Glass plate preparation: 8" by 8" by ⅛" square glass panes were cut into four equally sized plates. The plates were labeled to indicate which pane they came from and which quadrant the plate was in. Dish soap and water were used to rinse away any dirt, oils, and glass fragments which accumulated on the plates. They were then cleaned of any markings with acetone and then once again with isopropanol prior to coating. Optionally, the surfaces of glass plates from selected panes were activated with ozone plasma before applying the coating. The four plates from the pane were treated using a PSD Series Digital UV Ozone System. All four plates at once were exposed to the ozone generating UV light for 5 minutes per side. Coating of these plates took place immediately following the treatment.

Applications of coating and drying/curing: three of the four plates from each pane were coated with the solutions by using standard handheld spray bottles. The nozzles were adjusted so that overspray would be minimal from a spray distance of about 25 cm. The plates were leaned upright against a backing at about 60° above the horizontal. The line of spray was kept perpendicular to the plate; thus the angle of the spray stream was about 30° below the horizontal. Each side of the plates were sprayed with four pumps from the bottle while using a slight left and right motion to ensure complete coverage. Four pumps from the spray bottles dispensed between 4.0 and 4.5 mL of solution. After allowing the plates to drain for at least 30 seconds, they were placed upright in a clean box which was isolated from the room air. Drying took place in the box for a minimum of 16 hours. All spraying and drying was done in an air conditioned environment between 20° and 25° C. Once the plates were dried they were placed in an oven to cure. The oven was equipped with intake and exhaust air ports along with an air circulation pump to reduce any accumulation of moisture. The plates were placed in the oven to cure for a minimum of 16 hours at a temperature between 40° and 45° C. Once curing was complete the plates were placed in labeled sealable bags to protect the coatings during transport.

Transmission spectra of coated glass plates: the UV and visible (UV-Vis) transmission spectra of each coated plate was taken both before and after curing in the oven. The UV-Vis source was supplied by halogen and deuterium lamps while the UV-Vis irradiance was measured using an Ocean Optics Inc. HR 2000+ High Resolution Photo Spectrometer. The irradiance values were measured as a percentage with the transmission through air being the 100% reference. Marks and measurements on the plates were used to ensure that the UV-Vis was taken at identical points in every plate before and after curing. The transmission spectra show no difference (or a difference that was below the variation generated by the instrument) between the coated glass plates and pristine ones.

Strength testing: the testing method for equibiaxial flexural strength was adopted from the ASTM standard (ASTM Designation C1499-09, Reapproved 2013), but with some modification. The standard calls for the ring on ring method where an Instron 4505 was used to compress the test specimens between the rings to the failure point. The outside diameter of the load ring and support ring measured 45.237 mm and 83.109 mm respectively. The cross sections of the rings had no tip radius. Instead the interfaces between the rings and test specimens were circular annuli with beveled edges. The inner and outer diameters of the load ring annulus were approximately 41.300 mm and 44.450 mm respectively. The inner and outer diameters of the support ring annulus were approximately 82.017 mm and 77.089 mm respectively. Parafilm was used for the protective layers between the rings and test specimens. Cellophane tape was used as a friction reducing agent for the load ring. The tape was placed between the parafilm and the test specimen with the adhesive side to the parafilm. All strength testing took place in an air conditioned environment between 20° and 25° C. The stress, load, and displacement values were recorded at the breaking points of each test. The one plate left uncoated from each 8" by 8" pane served as the glass baseline only for the test specimens which were cut from the common pane. This was necessary because of the high deviation of stress values observed in the plain glass. The broken specimens were handled carefully so pictures could be taken of the fracture patterns. Each specimen was checked for its test validity and then categorized according to the energy associated with its fracture pattern.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A method for treating a material to form a laminate, the method comprising:
    selecting one or more graphitic or organic/inorganic nanomaterials;
    mixing the one or more graphitic or organic/inorganic nanomaterials with one or more surfactants to form an intermediate mixture;
    adding the intermediate mixture into a base composite solution to form a nanomaterial composite solution, wherein the base composite solution comprises water, 3-glycidoxypropyl-trimethoxysilane, isopropanol, glycerol and vinyl acetate monomer; and
    depositing the nanomaterials composite solution on a surface of a material, wherein the nanomaterial composite solution and the material form a laminate after the nanomaterial composite solution dries.

2. The method of claim 1 further comprising the step of purifying the graphitic or organic/inorganic nanomaterials.

3. The method of claim 2, wherein the purifying step is performed with an oxidation, reduction, or acid/base treatment.

4. The method of claim 3, wherein the graphitic or organic/inorganic nanomaterials are mixed and sonicated with HCl to remove metal impurities, and the graphitic or organic/inorganic nanomaterials are mixed and sonicated with $H_2O_2$ to remove amorphous carbon impurities.

5. The method of claim 4, wherein the intermediate mixture of the graphitic or organic/inorganic nanomaterials and the one or more surfactants is stirred for 3 days.

6. The method of claim 5, wherein the one or more graphitic or organic/inorganic nanomaterials is selected from carbon black, carbon nanofibers, graphite, graphenes, graphene oxides, micro carbon fibers, or buckyballs, and
    the concentration of the one or more graphitic or organic/inorganic nanomaterials is 0.01 to 10%.

7. The method of claim 4, wherein the nanomaterial composite solution of the intermediate mixture and the base composite solution is stirred for 24 hours and set for 3 days to form a solution without aggregations.

8. The method of claim 7, wherein the one or more graphitic or organic/inorganic nanomaterials is selected from silver, titanium oxide, zinc oxide, aluminum oxide, iron oxide and clay, which may be composed of kaolinite, montmorillonite, illite or chlorite, and
    the concentration of the one or more graphitic or organic/inorganic nanomaterials is 0.01 to 10%.

9. The method of claim 1 further comprising the step of activating the surface of the materials.

10. The method of claim 1, wherein the one or more graphitic or organic/inorganic nanomaterials is selected from carbon black, carbon nanofibers, graphite, graphenes, graphene oxides, micro carbon fibers, or buckyballs.

11. The method of claim 1, wherein the one or more graphitic or organic/inorganic nanomaterials is selected from silver, titanium oxide, zinc oxide, aluminum oxide, iron oxide and clay, which may be composed of kaolinite, montmorillonite, illite or chlorite.

12. The method of claim 1, wherein the base composite solution consist of water, 3-glycidoxypropyl-trimethoxysilane, isopropanol, glycerol and vinyl acetate monomer.

13. The method of claim 1, wherein the one or more surfactants is an anionic surfactant, cationic surfactant, ampholytic surfactant, or nonionic surfactant.

14. The method of claim 1, wherein the one or more surfactants is sodium dodecyl-benzenesulfonate.

\* \* \* \* \*